United States Patent [19]

Olasz

[11] Patent Number: 4,652,148
[45] Date of Patent: Mar. 24, 1987

[54] GUIDE SYSTEM
[75] Inventor: Joseph S. Olasz, N. Kingston, R.I.
[73] Assignee: Federal Products Corporation, Providence, R.I.
[21] Appl. No.: 810,726
[22] Filed: Dec. 19, 1985

Related U.S. Application Data

[62] Division of Ser. No. 712,273, Mar. 15, 1985.

[51] Int. Cl.$^4$ ............................................. F16C 32/06
[52] U.S. Cl. ........................................ 384/99; 384/122
[58] Field of Search ................. 384/99, 122, 121, 117, 384/8, 12; 308/5 R, 3 A

[56] References Cited

U.S. PATENT DOCUMENTS

| | | | |
|---|---|---|---|
| 3,146,037 | 8/1964 | Hooker | 384/121 |
| 3,578,827 | 5/1971 | Smith | 308/5 R |
| 4,378,134 | 3/1983 | Eddy | 308/3 A |
| 4,560,213 | 12/1985 | Enderle et al. | 384/99 |

OTHER PUBLICATIONS

El Blondeel et al "Externally Pressurized Bearings . . . " 7th International Gas Bearing Symposium Jul. 13-15, Cambridge, England.

Primary Examiner—Lenard A. Footland
Attorney, Agent, or Firm—Morse, Altman & Dacey

[57] ABSTRACT

An improved system for guiding one part relative another in an accurately defined path, both planar and linear, is disclosed. The improved system eliminates friction associated with heretofore moving parts, is characterized by simplicity and cost effectivness, and comprises a first part having a primary reference surface prepared to close tolerances and accurately defining a predetermined path and an opposed parallel secondary surface, and a second part designed for guidance by the primary surface. A fixed air pad is adjustably mounted on the second part adjacent the primary surface. A second air pad is resiliently mounted on the second part adjacent the opposed secondary surface. The resilient mounting includes a bellows. Fluid under pressure is admitted to both air pads, directly to the first and indirectly via the bellows to the second. Preferably, the fluid is compressed air.

6 Claims, 7 Drawing Figures

GUIDE SYSTEM

This is a division of application Ser. No. 712,273 filed on Mar. 15, 1985.

BACKGROUND OF THE INVENTION

1. Field of the Invention

The present invention relates generally to systems for guiding one part relative to another in an accurately defined path and, more particularly, to such a system incorporating a fluid spring that eliminates friction on heretofore found moving parts.

2. The Prior Art

In the machining tool industry, workpieces sometimes must be cut and formed to extremely accurate dimensions. Such work requires that one movable part traverses an extremely accurately defined path relative to another part. This in turn requires that the latter part be provided with opposed sides that are both straight and parallel for engagement by the opposed surfaces of the movable part. Deviations in the opposed sides do occur however. Consequently, it is not only difficult but also is rather expensive to provide a path whose opposed surfaces are exactly straight and parallel to one another. This is especially so the greater is the required length of the accurately defined path.

Two known systems of an affiliated company have addressed this problem. In U.S. Pat. No. 3,578,827, an accurate guiding system is disclosed which comprises two bearings carried by one component and positioned adjacent two opposed walls of the second component. One of the bearings is mounted on a rigid bar adjacent the accurate side. The other bearing is connected to the first by a solid but resiliently mounted bar, giving it freedom to float on the not so accurate surface. The path of movement is controlled by the rigidly mounted bearing, with the second bearing floating to accommodate dimensional differences. In U.S. Pat. No. 4,378,134, the bearings are piston-mounted air bearings, one being fixed, the other floating.

Both systems achieve the desired objective. Both do so with complexity and expense, however. In addition, both involve some friction occasioned by the presence of moving parts in the bearings. There is thus room for improvements.

SUMMARY OF THE INVENTION

It is a principal object of the present invention to overcome the above disadvantages by providing an improved, simplified and less expensive system for accurately guiding one part relative to another in an accurately defined path, and which does so without friction on heretofore existing moving parts.

More specifically, it is an object of the present invention to provide a system for accurately guiding one part relative to another in a plane or in linear motion comprising a first part having a primary reference surface prepared to close tolerances and an opposed parallel secondary surface and, a second part designed for guidance by the primary surface. A first fluid means is fixedly yet adjustably mounted on the second part adjacent the primary surface. A second fluid means is resiliently mounted on the second part adjacent the secondary surface and is free to float so as to adjust to its irregularities. The resilient mounting of this second fluid means includes a bellows, preferably a metal bellows. The utilization of the bellows eliminates friction on heretofore found moving parts. Means is provided to supply fluid under pressure to the first fluid means directly, and to the second fluid means via the bellows. Preferably, the fluid is compressed air. In a further embodiment, compressed air also is supplied directly to the second fluid means and the bellows is connected to a separate fluid reservoir contained within a second bellows. The second bellows preferably is disposed within a vessel having an air inlet. Preferably, a manifold is interposed between the hydraulic fluid reservoir and the fluid means to convey fluid, such as hydraulic fluid or air under pressure to a plurality of bellows incorporated into a plurality of fluid means mounted on the second part. Preferably, both bellows are metal bellows, formed preferably of stainless steel. The bellows also can be formed of suitable plastics, however. In a further embodiment, a rotary table is pre-loaded against and thus accurately guided by a stationary primary surface in a horizontal plane with a plurality of resiliently mounted air pads creating an air gap against a rotating parallel secondary surface of the table.

Other objects of the present invention will in part be obvious and will in part appear hereinafter.

The invention accordingly comprises the improved system for accurately guiding one part relative another of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENTS

Figure 1:
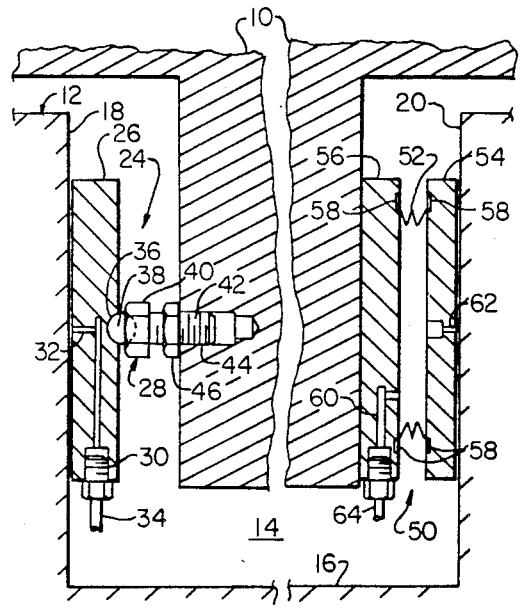
FIG. 1. is a fragmentary section of a system for accurately guiding one part relative to another and constructed in accordance with the present invention.
Figure 2:
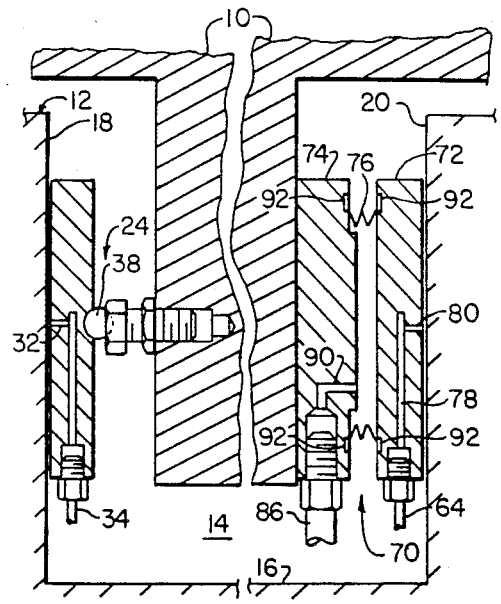
FIG. 2 is a view similar to that shown in FIG. 1 but showing a different embodiment thereof.
Figure 4:
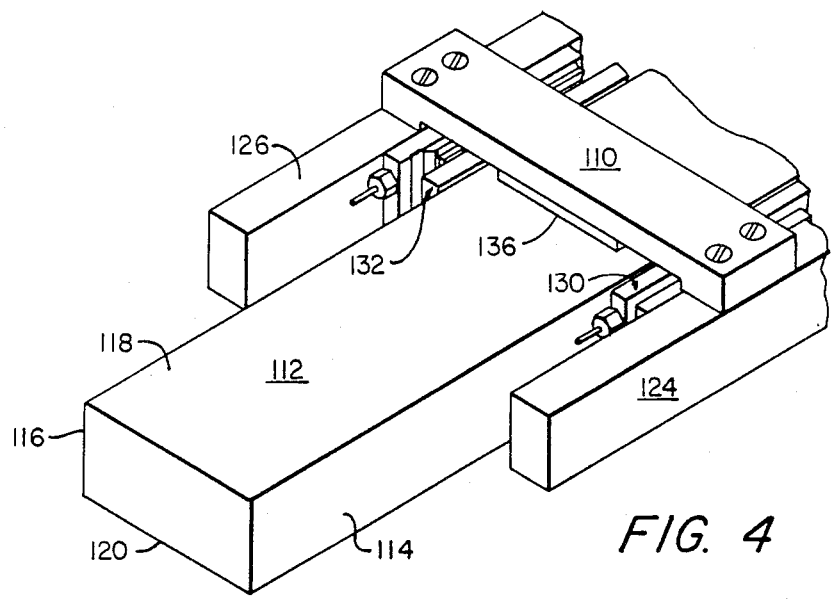
FIG. 4 is an isometric perspective of a further embodiment of a system for accurately guiding one part relative to another and constructed in accordance with the present invention.
Figure 5:
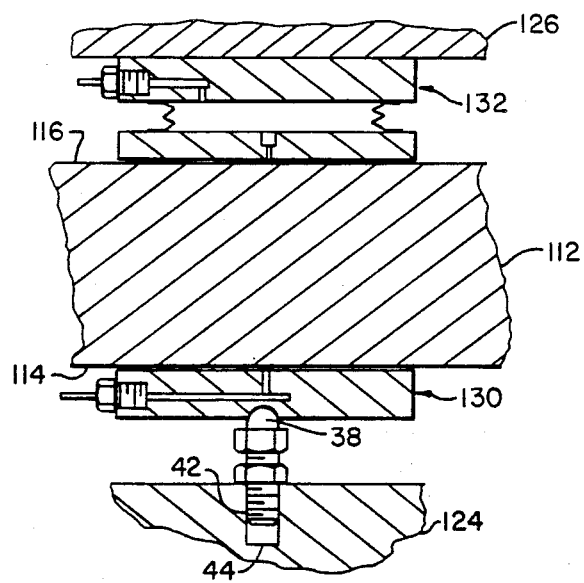
FIG. 5 is a longitudinal section of the system of FIG. 4.

In general and as illustrated in FIGS. 1 and 2, the guide system of the invention is used and is useful in precisely guiding a part, such as a carriage 10 of a machine tool in an extremely accurately defined path with respect to another part, such as a fixed table 12. These parts, i.e., the movable carriage 10 and the fixed table 12, are herein illustrated as being similar to like parts illustrated in U.S. Pat. No. 4,378,134 that issued to Richard P. Eddy on Mar. 29, 1983 and assigned to an affiliated company, Excellon Industries, Torrance, Calif., the disclosure of which is incorporated herein by reference. The invention is equally applicable to any and all precision guiding and measuring systems, including coordinate measuring systems, and the like. The guide system of the invention also is illustrated in FIGS. 4 and 5 as being incorporated in an arrangement similar to that described in U.S. Pat. No. 3,578,827 that issued to Joseph E. Smith on May 18, 1971 and also assigned to the same affiliated company, to wit, Excellan Industries of Torrance, Calif., the disclosure of which also is incorporated herein by reference.

In the illustrations of FIGS. 1 and 2, the table 12 is provided with a channel 14 having a bottom 16, a primary reference side surface 18 and an opposed parallel secondary side surface 20. It is to be noted that the primary side surface 18 is made to extremely precise tolerances so that it is as close as possible to being exactly planar. The secondary parallel side surface 20, on the other hand, is not made to such close tolerances and so is not as close to being planar as is the surface 18. Consequently, there exist slight differences in the spacing and angularity of the surfaces 18 and 20 along the respective lengths of these surfaces. Bearings, not shown, support the carriage 10 vertically with respect to the table 12.

The carriage 10 is guided in its fixed horizontal path of travel along the table 12 by a plurality of fluid bearings, preferably four such fluid bearings, two on one side of the carriage 10 and two on the other side. The fluid bearings on each side are identical; hence only one of such is shown and described in detail.

A first fluid bearing 24 is fixedly yet adjustably mounted on the carriage 10 adjacent the reference side surface 18 of the table 12. The first fluid bearing 24 essentially comprises an air pad 26 and a ball support 28. The air pad 26 is provided with an air inlet 30 communicating with an air outlet 32, i.e., a narrow gap which can be any type of air jet presently employed in such air pads. As known in systems of this kind, air escaping via the air outlet 32 provides a film of air and thus an almost friction-free relationship between the air pad 26 and the primary side surface 18. Air under pressure is admitted to the air inlet 30 of the air pad 26 via a suitable air hose 34, which is connected to a supply of compressed air, not shown, found in most, if not all, factories. Preferably, the pressure of the compressed air is from about 45 to about 75 p.s.i., with 100 p.s.i. being maximum. The air pad 26 further is provided with a slight depression 36 concentric with the air outlet 32 into which a ball 38 is designed to fit. The ball 38 in turn is supported within a suitable fitting 40 secured on one end of a threaded stud 42 received within an internally threaded bore 44 formed in the carriage 10. The axial position of the stud 42 is adjustable by rotation of the stud 42 within the bore 44. With the translational position of the ball 38 being so adjusted, the stud 42 and the ball 38 are held in their adjusted positions by a lock nut 46.

A second fluid bearing 50 is resiliently mounted on the carriage 10 adjacent the opposed parallel secondary side surface 20 of the table 12. It is the function of the resilient mounting of this second fluid bearing 50 to float along the irregular secondary side surface 20, with its imperfections and deviations, and to force the carriage 10 and thereby the first fluid bearing 24 against the extremely accurately formed primary side surface 18 of the table 12 as the carriage 10 is moved along the axial length of the channel 14. This resilient mounting of the second fluid bearing 50 is effected by the incorporation therein of a bellows 52 sandwiched in between an air pad 54 and a member 56 secured to the carriage 10. The bellows 52, which preferably is a metal bellows made for example of stainless steel, is secured in airtight relation to and between the air pad 54 and the member 56, as at 58, respectively. Compressed air is admitted through a channel 60 into the interior of the bellows 52. From the bellows 52, the air only can escape via an air outlet 62, formed as a narrow gap centrally in the air pad 54. The air escaping through the air outlet 62 of the air pad 54 also provides a film of air and thus an almost friction-free relationship between the air pad 54 and the irregular secondary side surface 20. The compressed air is admitted to the channel 60 via a suitable air hose 64, which preferably also is connected to the same supply of compressed air as is the hose 34; thus both hoses 34 and 64 carry the same air pressure.

Unlike in the prior art systems as per U.S. Pat. Nos. 3,578,827 and 4,378,134 mentioned above, the employment of the bellows 52 in the second fluid bearing 50 involves no friction on moving parts which may adversely affect the translatory motion of the carriage 10 within the channel 14 of the table 12. Further, unlike the piston-cylinder system of U.S. Pat. No. 4,378,134, there is here no escape of any air at the bellows 52 or its mountings as at 58, as contrasted with the escape of some air at the "O" rings in said U.S. Pat. No. 4,378,134. For, even such minute escape of air still adversely impacts on the otherwise precise translationary motion of the carriage 10 within the channel 14 of the table 12.

Figure 3:
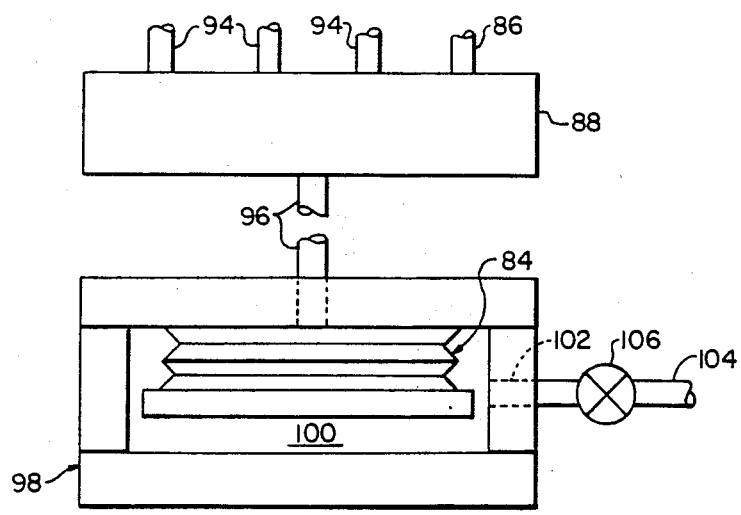
FIG. 3 is a schematic plan view of component parts useful in the practice of the invention.

A second embodiment of the invention is illustrated in FIG. 2, which is a view similar to that shown in FIG. 1 and where like reference characters refer to like parts throughout. In this embodiment, a differently constructed second fluid bearing 70 is mounted resiliently on and between the carriage 10 and the opposed parallel secondary side surface 20 of the table 12. This second fluid bearing 70 comprises an air pad 72, a member 74 and a therebetween mounted metal bellows 76. Unlike the fluid bearing 50 illustrated in FIG. 1, in this second fluid bearing 70, compressed air via the air hose 64 is admitted directly into a channel 78 formed in the air pad 72 itself, whence it exits through an air outlet 80 so as to form a film of air between the air pad 72 and the side surface 20. The metal bellows 76 itself is connected to a separate fluid reservoir 84 (see FIG. 3) via a flexible hose 86 and a manifold 88. The fluid reservoir 84 can be filled with a hydraulic fluid or air. Consequently, the expansionary force within the bellows 76, i.e., the hydraulic fluid, is effectively isolated from the compressed air admitted to the air pad 72. This separate and tandem arrangement not only provides for a more effective control and application of resiliency to the fluid bearing 70, as contrasted with the fluid bearing 50 of FIG. 1, but additionally it also provides a dampening effect on any potential vibration of the carriage 10 as it moves along the channel 14 of the table 12. This dampening effect further stabilizes the carriage 10 and results in a more accurate guiding thereof as determined by the reference side 18.

The hydraulic fluid, which may be oil or silicone oil or air or the like, is admitted into the interior of the metal bellows 76 via a suitable channel 90 formed in the member 74. The bellows 76 also is fluid-tightly secured, as at 92, between the member 74 and the air pad 72.

The manifold 88 is shown illustrated with a number of additional flexible hoses 94, one each for a separate fluid bearing, which is constructed just like the bearing 70 described above. The manifold 88 itself is connected to the hydraulic fluid reservoir 84 via a further flexible hose 96. The hydraulic fluid reservoir 84, which also preferably is formed as a metal bellows, is preferably contained within a suitable vessel 98 provided with a pressurized air chamber 100 having an air inlet 102 and no air outlet. A flexible hose 104 is shown connected to the air inlet 102 via an adjustable pressure relief valve 106. Preferably, the hose 104 also is connected to the same source of compressed air supply as are the hoses 34 and 64. As evident, the above described hydraulic fluid system is a closed loop hydraulic pump system. As such, it represents an efficient way of providing the additional resilient cushioning effect behind the air pad 72 in the fluid bearing 70, shown in and described with reference to FIG. 2.

As illustrated in FIGS. 4 and 5, the guide system of the invention also is utilized to provide accurate rectilinear motion of a traveling plate 110 longitudinally of a beam 112 typically formed of granite. The beam 112 is rectangular in cross section, with sidewalls 114 and 116 and top and bottom walls 118 and 120, respectively. The side surface 114 is the primary surface and, as such, is prepared to a high degree of accuracy to define one plane. The side surface 116 is the secondary surface and is not formed to the same exact tolerances. The secondary surface 116 thus may possess irregularities, being only approximately straight and parallel to the primary surface 114.

The traveling plate 110 carries at its respective ends a pair of guide members 124 and 126. Guide members 124 and 126 are designed to be in parallel spaced relation to the primary and secondary side surfaces 114 and 116, respectively. Intermediate the guide members 124 and 126 and the respective primary and secondary side surfaces 114 and 116 are one or more pairs of fluid bearings 130 and 132, respectively, adjacent each side surfaces 114 and 116. Only one of each kind of the pair of fluid bearings 130 and 132 is shown since each adjacent one on the same side surface is identical to the one shown and hereinafter described. Whether to have one or more pairs of fluid bearings intermediate the guide members 124 and 126 and the side surfaces 114 and 116 depends, for the most part, on the respective sizes of the beam 112 and the plate 110 and the length of travel of the plate 110 along the beam 112. The greater the dimensions, the more will be the need to add additional pairs of fluid bearings 130 and 132 to achieve and to maintain the desired accuracy in guiding the plate 110 along the beam 112, or if desired, in guiding the beam 112 with respect to the plate 110.

It will be noted that the fluid bearing 130 is identical with the first fluid bearing 24 shown in and described with reference to FIG. 1 and, that the fluid bearing 132 is identical with the second fluid bearing 50, provided with the bellows 52, also shown in and described with reference to FIG. 1. Both fluid bearings 130 and 132 also function in the same manner as the fluid bearings 24 and 50. It will be appreciated by those skilled in the art that the ball 38 and the stud 42 of the bearing 24 can be replaced, if desired, by a rod having a spherical surface at one end and being externally threaded at the other end so as to fit within a tapped bore 44. One or more fluid bearings 136 preferably also are secured to the underside of the traveling plate 110. These fluid bearings 136 help support the weight of the assembly and facilitate the traversing of the plate 110 over the top wall 118 of the beam 112. The fluid bearings 136 can be either of the type of the first fluid bearing 24 or of the type of the second fluid bearing 50 with the bellows. If desired, one of each type of fluid bearings 24 and 50 may comprise the fluid bearings 136.

Figure 6:
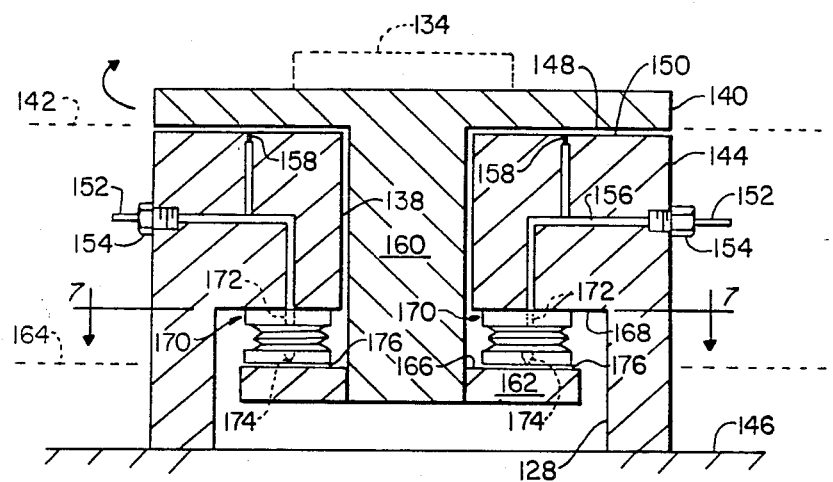
FIG. 6 is a vertical section of a still further embodiment of a system for accurately guiding a rotary part in a plane relative to another part and constructed in accordance with the present invention.
Figure 7:
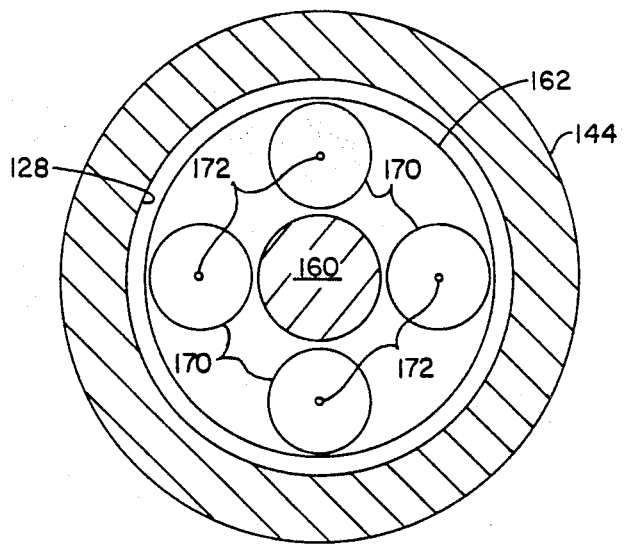
FIG. 7 is a section along the line 7—7 of FIG. 6.

As illustrated in FIGS. 6 and 7, the precision guide system of the invention also is applicable to provide accurate rotary motion of a rotary part 140 rotating in a plane 142, here a horizontal plane, with respect to a fixed, stationary support 144. Preferably, the stationary support 144 rests on a desk top 146. A work object 134, shown in phantom lines, when positioned on top of the rotary part 140, can be accurately measured to close tolerances by probes, not shown, as known. The precision guide system of the invention further assures the accuracy of such measurement by pre-loading the rotary part 140, assurring thereby that its top surface will remain at all times in the same exact horizontal plane 142 during its rotational displacement.

The rotary part 140 is formed on its underside with a primary reference surface 148 machined to extremely fine tolerances. The stationary support 144, in turn, also is formed on its topside with a primary reference surface 150 machined to extremely close tolerances. Air under pressure is introduced into the system, in particular in between the respective primary surfaces 148 and 150, via an air hose 152 and fitting 154 communicating with a bore 156. Preferably, air is admitted into the system through more than one hose and fitting, and preferably from a plurality of such hoses and fittings circumferentially of the system. The admitted air is allowed to escape via a plurality of orifices 158 formed in the primary surface 150 of the stationary support 144. This provides a film of air between the respective opposed primary surfaces 148 and 150 and consequently an almost friction-free relationship between the rotary part 140 and the stationary support 144.

The rotary part 140 also is formed with a concentric stem 160, which is designed to carry at its bottom end a circular plate 162. The circular plate 162 is designed to rotate in a plane 164 parallel to the plane 142 and is formed, at its topside, with a secondary surface 166. The stationary support 144, in addition to having a central opening 138 to snugly accomodate the stem 160 therein, also is formed with an underside 168 in a wider portion 128 of the central opening 138. The underside 168 serves as a secondary surface and is designed to have a plurality of fluid bearings 170 secured thereto, each in fluid, communication with the bore 156. Each of these plurality of fluid bearings 170 is like the second fluid bearing 50, featuring the bellows 52, shown in and described with reference to FIG. 1, except that air is admitted thereto via a central channel 172, rather than independently from the side. The air is allowed to escape from the fluid bearings 170 via an orifice 174 into an air gap 176 formed between the plurality of fluid bearings 170 and the secondary surface 166 of the circular plate 162.

As may be observed in FIG. 6, this air gap 176 and the air escaping thereto effects a downward thrust toward the circular plate 162 as opposed to the essentially upward thrust of the escaping air from the orifices 158 between the primary surfaces 148 and 150. Consequently, the rotating part 140 is preloaded by the plurality of fluid bearings 170 and the air escaping into the air gap 176. By so preloading the rotating part 140, it is further assured that the part 140 will remain in the exact same plane despite its rotational displacement. The accuracy of the measurements of the work 134 placed on top of the part 140 is thus materially enchanced.

Four such fluid bearings 170 are shown in FIG. 7. It must be pointed out that, if desired and/or the size of the system so requires, any number of fluid bearings 170 may be employed in the system of FIGS. 6 and 7.

Thus it has been shown and described an improved system for guiding one part relative to another part in an extremely accurately defined path, both linear and rotational, as represented by a primary side surface made to extremely precise tolerances and incorporating a fluid spring, represented by fluid bearings 50, 70, 130, 132 and 170, which system satisfies the objects and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. A system for guiding one part relative to another comprising:
   (a) a stationary support having a central opening and a primary and a secondary surface;
   (b) a member mounted for rotation about said support, said member provided with a stem fitting within said central opening and having a primary surface;
   (c) a plate secured to said stem and designed for rotation within said central opening and having a secondary surface;
   (d) a plurality of fluid bearings mounted to said secondary surface of said stationary support; and
   (e) means for supplying fluid under pressure to said primary surface of said member and to said secondary surface of said plate.

2. The system of claim 1 wherein said central opening is formed of two contiguous portions: a narrower portion snugly to accomodate said stem and a wider portion loosely to accomodate said plate.

3. The system of claim 1 wherein said plurality of fluid bearings are each provided with bellows.

4. The system of claim 1 wherein said fluid under pressure is air under pressure in a range from about 45 to about 75 p.s.i.

5. The system of claim 1 wherein said means for supplying fluid under pressure includes a hose and a fitting communicating with a bore formed in said stationary support, said bore terminating in a plurality of orifices at said primary surface of said stationary support, said bore also being in fluid communication with said plurality of fluid bearings to direct said fluid under pressure at said secondary surface of said plate.

6. The system of claim 5 wherein the fluid pressure of said fluid under pressure supplied by said means to said primary surface of said member is identical with the fluid pressure supplied to said secondary surface of said plate.

* * * * *